(12) United States Patent
Inoue et al.

(10) Patent No.: US 6,337,103 B1
(45) Date of Patent: *Jan. 8, 2002

(54) PROCESS FOR REMANUFACTURING CHARGING MEMBER, CHARGING MEMBER REMANUFACTURED BY THE REMANUFACTURING PROCESS, AND PROCESS CARTRIDGE HAVING THE CHARGING MEMBER

(75) Inventors: Hiroshi Inoue, Kamakura; Naoki Fuei, Kawaguchi, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/542,339

(22) Filed: Oct. 12, 1995

(30) Foreign Application Priority Data

Oct. 18, 1994 (JP) .............................. 6-252036

(51) Int. Cl.$^7$ .............................. B05D 3/12; B05D 5/00
(52) U.S. Cl. ................... 427/140; 427/142; 427/290; 427/309; 399/168; 399/176
(58) Field of Search ............... 427/140, 142, 427/290, 292, 309; 399/168, 176

(56) References Cited

U.S. PATENT DOCUMENTS

| | | | | |
|---|---|---|---|---|
| 4,897,302 A | * | 1/1990 | Bull ............................ | 428/283 |
| 5,035,089 A | * | 7/1991 | Tillman et al. ............... | 51/425 |
| 5,309,200 A | | 5/1994 | Michlin ...................... | 355/200 |
| 5,320,879 A | * | 6/1994 | Bullock ...................... | 427/576 |
| 5,390,007 A | * | 2/1995 | Kugoh et al. ................ | 355/219 |
| 5,499,078 A | * | 3/1996 | Kurokawa et al. ........... | 355/206 |
| 5,502,547 A | * | 3/1996 | Shirai ......................... | 355/215 |
| 5,565,968 A | * | 10/1996 | Sawa et al. .................. | 355/259 |
| 5,569,543 A | * | 10/1996 | Schaffer, Jr. et al. ........ | 428/552 |
| 5,678,140 A | * | 10/1997 | Fuei et al. ................... | 399/109 |

FOREIGN PATENT DOCUMENTS

| | | |
|---|---|---|
| EP | 328113 A2 | 8/1989 |
| EP | 602395 A2 | 6/1994 |
| EP | 0606907 | 7/1994 |

OTHER PUBLICATIONS

Patent Abstracts of Japan, vol. 17, No. 320, with respect to JP 5–34952, p. 1558, Jun. 17, 1993.*
Patent Abstracts of Japan, vol. 18, No. 273 (P–1742) with respect to JP 6–43663 of Feb. 18, 1994 (May 24, 1994).
Patent Abstracts of Japan, vol. 17, No. 320 (P–1558) with respect to JP 5–34952 of Feb. 12, 1993 (Jun. 17, 1993).
Patent Abstracts of Japan, vol. 18, No. 561 (P–1818) with respect to JP 6–202533 of Jul. 22, 1994 (Oct. 26, 1994).
Patent Abstracts of Japan, vol. 18, No. 211, (P–1726) with respect to JP 6–12007 of Jan. 21, 1994 (Apr. 14, 1994).

* cited by examiner

*Primary Examiner*—Michael Barr
(74) *Attorney, Agent, or Firm*—Fitzpatrick, Cella, Harper & Scinto (57) ABSTRACT

A process for remanufacturing a charging member having at least two layers on a conductive support is described. The process involves carrying out mechanical abrasion to remove at least a surface layer of the charging member, followed by forming a layer thereon. Also, a charging member remanufactured by the process and a process cartridge having the hanging member are described.

3 Claims, 5 Drawing Sheets

PROCESS FOR REMANUFACTURING CHARGING MEMBER, CHARGING MEMBER REMANUFACTURED BY THE REMANUFACTURING PROCESS, AND PROCESS CARTRIDGE HAVING THE CHARGING MEMBER

BACKGROUND OF THE INVENTION

1. Field of the Invention

This invention relates to a process for remanufacturing a charging member. This invention also relates to a charging member remanufactured by the remanufacturing process and a process cartridge having such a charging member.

2. Related Background Art

In electrophotographic image forming apparatus such as copying machines, laser beam printers and facsimile machines, various charging members, e.g., development charging rollers, transfer charging rollers and primary charging rollers have been used. Almost all of these charging rollers have been used up and have not been reused. Also, any rejected products caused during their manufacture can not be used as products and hence have been discarded without being repaired.

This is because these charging rollers have had the problem that, when repeatedly applied to electrophotographic processes, they cause a lowering of their electrical properties and no longer exhibit the electrical properties of the same level as the initial stage. The lowering of electrical properties of various charging members may be caused by, e.g., surface deterioration of charging members which is due to the effect of ozone or the like generated by discharge at the time of charging, and surface wear of charging members which is caused by their contact with materials or members to be charged by the charging members.

There is another problem that the surface wear of charging members, caused by their contact with materials or members to be charged by them, may damage surface properties such as lubricity and smoothness.

During repeated use of the charging rollers, powdery developer (toner) and paper dust also may adhere to the whole surfaces or peripheries of their outermost layers.

If such charging rollers are reused without means such as cleaning, the contamination of their surfaces makes surface resistance of charging rollers uneven especially in an environment of low humidity and low temperature to cause non-uniform charging. The charging rollers having caused a lowering of charging performance tend to be affected by such contamination of surfaces.

In addition, the charging members provided in the above electrophotographic apparatus are not limited to those having a single-layer structure, and those having a multi-layer structure, comprising a plurality of layers overlaid one another, are widely used. When the charging members are formed in the multi-layer structure, means such as coating is commonly used. When the layers are formed by coating, defective coatings such as uneven coatings, uneven coating thickness and spitting may occur in some cases. The presence of such defective coatings in charging members makes the surface resistance delicately uneven at that portion to enable no uniform charging to cause faulty images.

Meanwhile, recently, ecology (the advocacy of protection of the global environment from destruction and pollution for the purpose of gentle coexistence in the global environment) is spreading worldwide. From the viewpoint of the saving of global natural resources and the protection of environment, studies are also made on the charging members for the electrophotographic apparatus so that they can be remanufactured and reused in some way.

As methods of remanufacturing charging members, a method is known in which the surfaces of members are cleaned with a solvent to remove contamination.

Since, however, the surface layers of charging members are mostly those containing synthetic resin, synthetic rubber or the like, the above prior art cleaning method is not preferable for the following reasons (A) and (B).

(A) Synthetic resins and synthetic rubbers tend to dissolve upon contact with the cleaning solvent or cause cracks, and there is a possibility of damaging various properties required in charging members of this type, such as electrical resistance, hardness, surface roughness, roundness, straightness and lubricity (frictional coefficient).

(B) The charging members of this type are not limited to those having a single-layer structure, and those having a multi-layer structure are widely used. In the case of multi-layer rollers, the cleaning solvent may soak through the layers from the edges of rollers, and care must be taken not only for solvent resistance of surface layer materials but also solvent resistance of inside materials. This not only imposes limitations on the types of cleaning solvents used but also causes a possibility of a decrease in adhesion between layers.

SUMMARY OF THE INVENTION

An object of the present invention is to settle the problems discussed above, to provide a process for remanufacturing a charging member in order to obtain a charging member having the same good performances as virgin products.

Another object of the present invention is to provide a charging member remanufactured by such a remanufacturing process and a process cartridge having the charging member thus obtained.

The present invention provides a process for remanufacturing a charging member having at least two layers on a conductive support, the process comprising the steps of;

carrying out mechanical abrasion to remove at least a surface layer provided on the charging member; and forming a layer on the surface laid bare by the abrasion.

The present invention also provides a charging member remanufactured by the above remanufacturing process, and a process cartridge having such a charging member.

DESCRIPTION OF THE PREFERRED EMBODIMENTS

The remanufacturing process of the present invention comprises the steps of carrying out mechanical abrasion to remove at least a surface layer provided on the charging member, and forming a layer on the surface laid bare by the abrasion.

The charging member of the present invention has at least two layers on a conductive support and may have the shape of a roller, a blade or the like. In the present invention, in view of readiness for the mechanical abrasion, the member may preferably have the shape of a roller.

Figure 1:
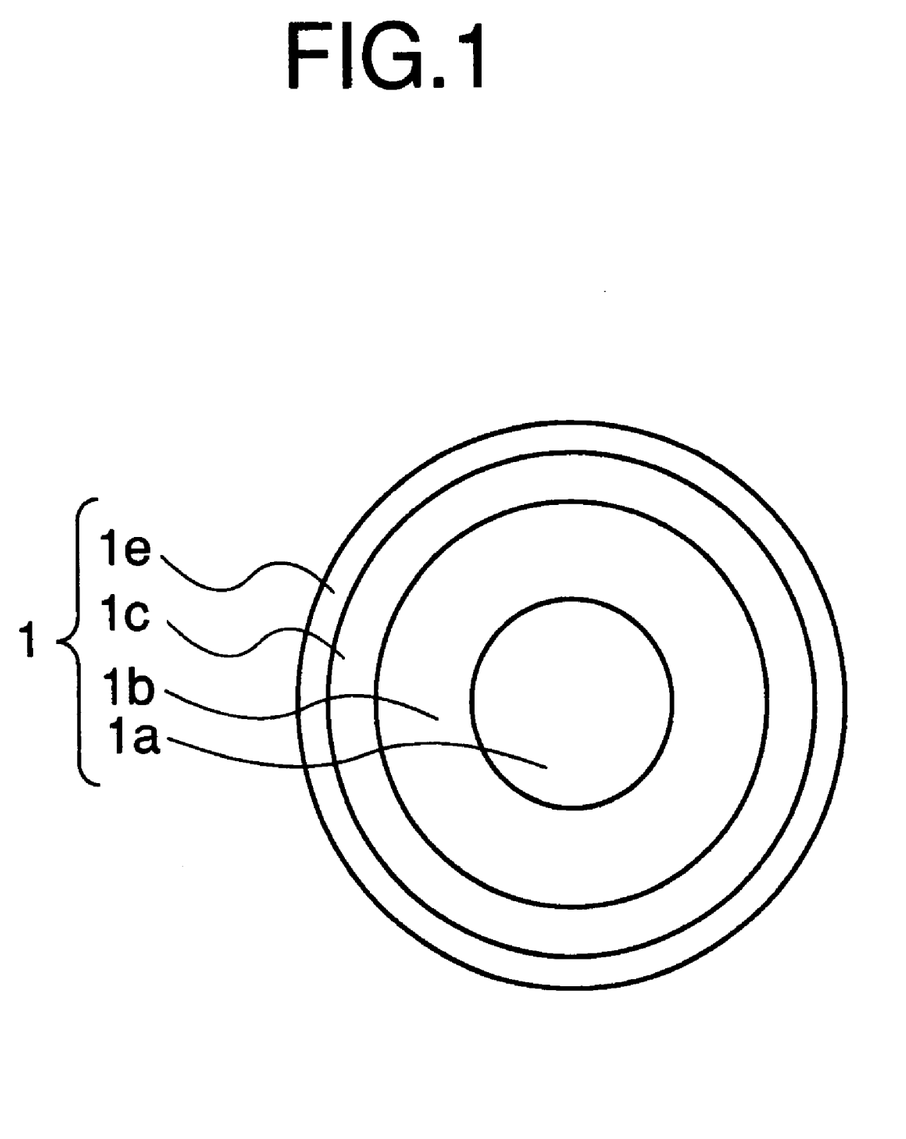
FIG. 1 illustrates an example of the layer structure of the charging member according to the present invention.
Figure 2:
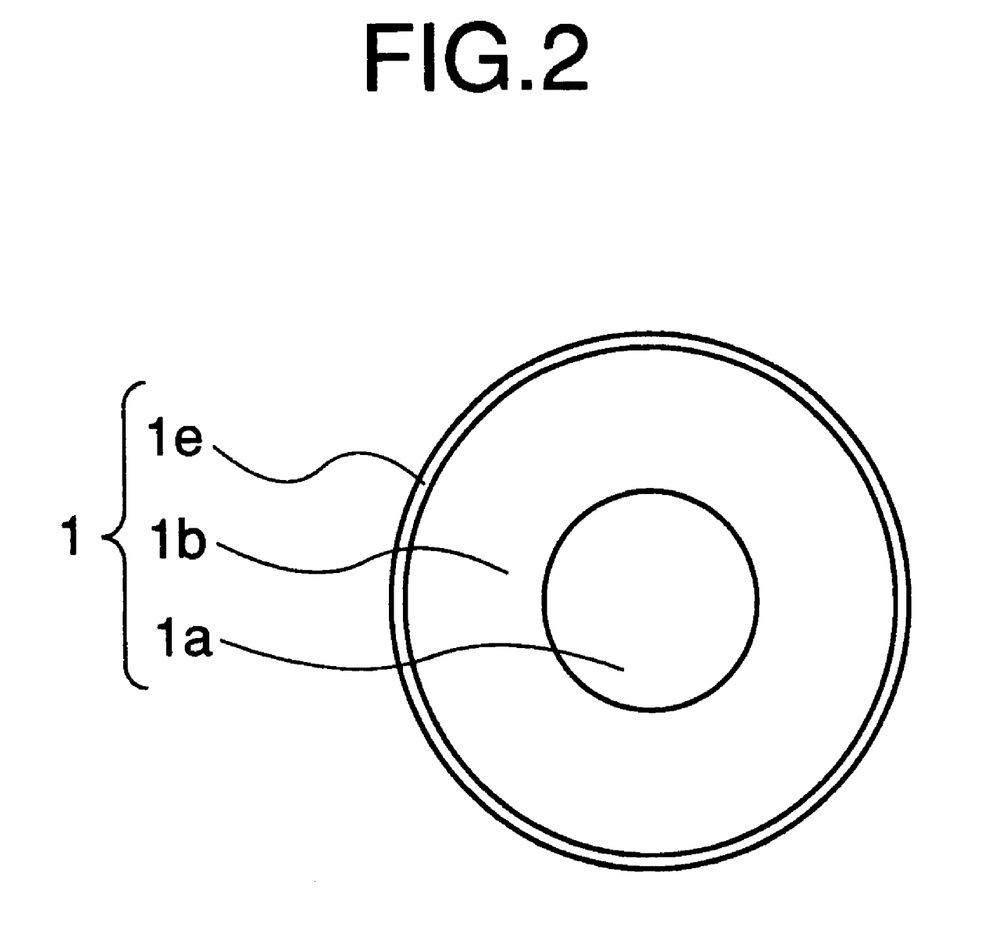
FIG. 2 illustrates another example of the layer structure of the charging member according to the present invention.
Figure 3:
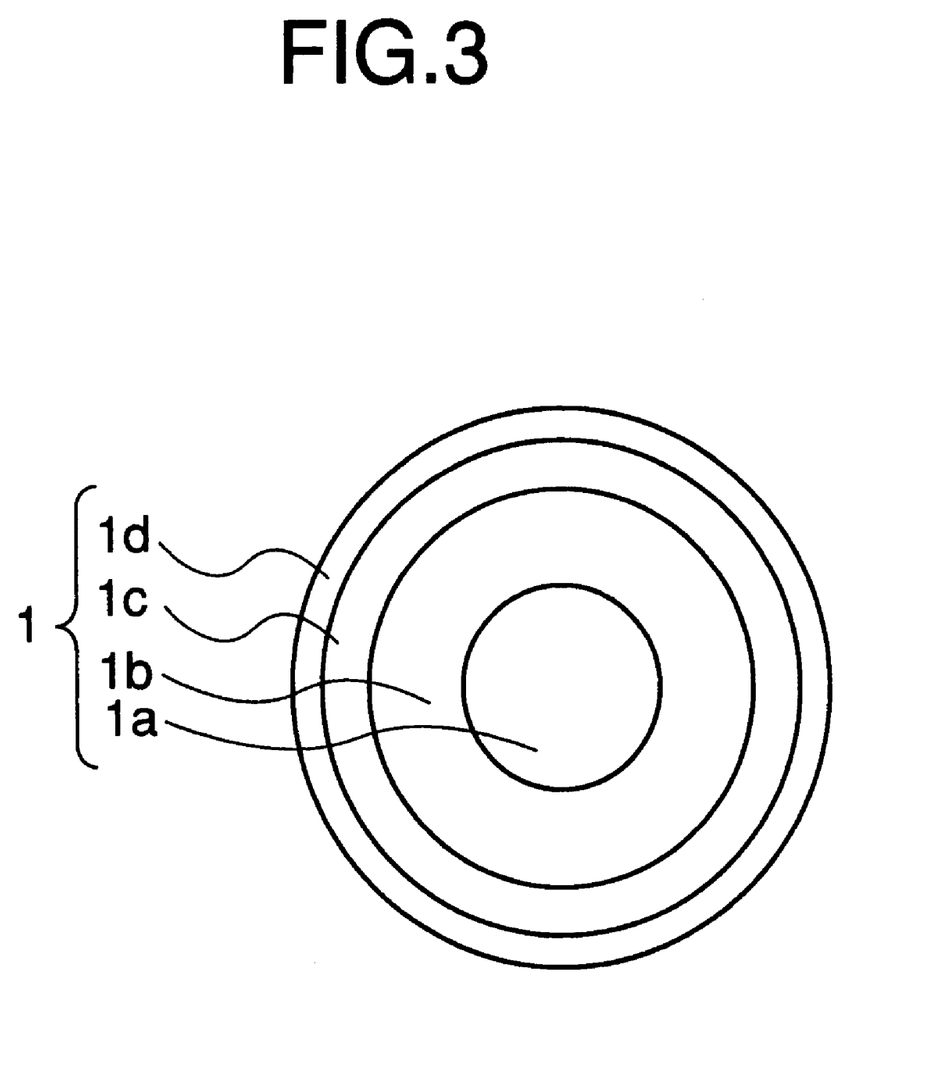
FIG. 3 illustrates an example of the layer structure of a charging member before the remanufacturing process of the present invention is applied.

FIGS. 1 and 2 illustrate examples of the layer structure of the charging member having the shape of a roller according to the present invention. FIG. 3 illustrates an example of the layer structure of a charging member before the remanufacturing process of the present invention is applied.

In these drawings, reference numeral 1 denotes a charging member; 1a, a conductive support; 1b, an elastic layer; 1c, a resistance control layer; and 1d and 1e, covering layers (or surface layers).

In the present invention, the layer 1d (FIG. 3), which is a surface layer having caused difficulties or having deteriorated, standing before remanufacturing, is mechanically abraded to be removed in its entirety or in part, and thereafter a surface layer 1e is formed anew on the abraded surface to thereby make uniform the surface resistance of the charging roller and bring back the electrical properties and surface properties (lubricity and smoothness) required in charging members, to a satisfactory condition so that the charging roller can be reused (FIG. 1). The charging roller before reuse may be constituted of the elastic layer 1b and the surface layer 1d, having no resistance control layer 1c. In this case, the surface layer 1d may be removed by abrasion and the covering layer 1e may be formed on its periphery to provide the charging roller as shown in FIG. 2.

In the present invention, the covering layers 1d (before remanufacture) and 1e (after remanufacture) may not necessarily be of the same type. Also, the layer to be removed by abrasion may not necessarily be only the surface layer, and a layer or layers beneath the surface layer may be removed. The layer to be formed anew may also not necessarily be one layer, and a plurality of layers may be formed.

The conductive support 1 used in the present invention may be made of metal such as iron, copper, stainless steel, aluminum or nickel, any of which may be used. The metal surface thereof may be further treated by plating for the purpose of rust-proofing or providing scratch resistance, but it is necessary not to damage the conductivity.

Figure 5:
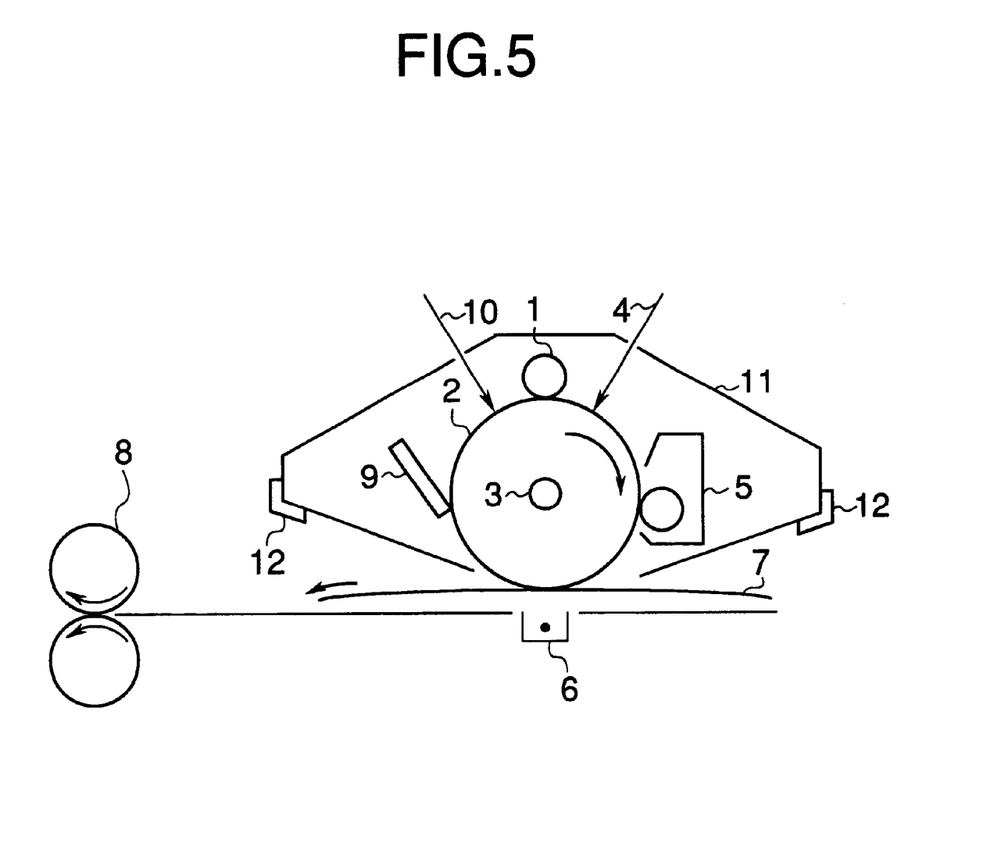
FIG. 5 schematically illustrates an example of the construction of an electrophotographic apparatus having a process cartridge having the charging member of the present invention.

In the charging roller 1, the elastic layer 1b is endowed with an elasticity suitable for ensuring good and uniform close contact of the charging roller 1 with a photosensitive member 2 (FIG. 5).

Conductivity of the elastic layer 1b is controlled by adding a conductive agent such as carbon black to an elastic material such as rubber. Its elasticity is controlled by adding a process oil, a plasticizer and so forth. The elastic material for the elastic layer 1b may specifically include, for example, natural rubber, synthetic rubbers such as ethylene propylene diene methylene rubber (EPDM), styrene-butadiene rubber (SBR), silicone rubber, urethane rubber, epichlorohydrin rubber, isoprene rubber (IR), butadiene rubber (BR), nitrile-butadiene rubber (NBR) and chloroprene rubber (CR), and also resins such as polyamide resin, polyurethane resin, silicone resin and fluorine resin. A foam of the above elastic material may also be used in the elastic layer 1b.

The resistance control layer 1c is often provided in order to control the resistance of charging members. Materials for the resistance control layer 1c may specifically include resins such as polyamide resin, polyurethane resin, fluorine resin and silicone resin, and also epichlorohydrin rubber, urethane rubber, chloroprene rubber and acrylonitrile rubbers. For the purpose of resistance control, a conductive material may be dispersed also in the resistance control layer 1c, which includes conductive particles such as carbon black and carbon graphite, conductive metal oxides such as conductive titanium oxide, conductive zinc oxide and conductive tin oxide, as well as conductive agents such as alkali metal salts and ammonium salts.

The covering layers 1d and 1e are often provided in order to prevent a plasticizer or the like in the elastic layer 1b from bleeding out to the surface of the charging roller and to maintain the lubricity and smoothness of the charging roller surface. The covering layers 1d and 1e are each provided by coating or tubing.

In the case when the covering layers 1d and 1e are provided by coating, materials therefor may specifically include resins such as polyamide resin, polyurethane resin, acrylic resin, fluorine resin and silicone resin, and also epichlorohydrin rubber, urethane rubber, chloroprene rubber and acrylonitrile rubbers. The coating may be carried out by a process including dip coating, roll coating and spray coating.

In the case when the covering layers 1d and 1e are provided by tubing, materials therefor may specifically include nylon 12, PFA (tetrafluoroethylene-perfluoroalkyl vinyl ether copolymer resin), PVDF (polyvinylidene fluoride), FEP (tetrafluoroethylene-hexafluoropropylene copolymer resin), and also thermoplastic elastomers of a polystyrene type, a polyolefin type, a polyvinyl chloride type, a polyurethane type, a polyester type or a polyamide type.

The tubing may be either heat-shrinkable tubing or non-heat-shrinkable tubing.

In order to impart a suitable conductivity also to the covering layers 1d and 1e, a conductive material may be used, which includes conductive particles such as carbon black and carbon graphite, conductive metal oxides such as conductive titanium oxide, conductive zinc oxide and conductive tin oxide, as well as conductive agents such as alkali metal salts and ammonium salts.

When the charging roller of the present invention is used, its surface irregularities may cause delicate charge non-uniformity if the charging roller has a rough surface, without regard to whether the relation between the charging roller and the photosensitive member is of contact or non-contact, and consequently faulty images may occur. Hence, the charging roller may preferably have a smoother surface and should preferably have a 10-point average surface roughness Rz of 100 $\mu$m or less, and more preferably of 15 $\mu$m or less, according to JIS B0601 standard of surface roughness.

The covering layers 1d and 1e should each preferably have a layer thickness of 5,000 $\mu$m or less, and more preferably within the range of from 1 to 500 $\mu$m. So long as the covering layer has a layer thickness within the range of from 1 to 500 $\mu$m, the function of a layer lying beneath the covering layer can be well brought out and hence it is not especially necessary to impart various functions to the covering layer. If the covering layer is formed in a layer thickness larger than 500 $\mu$m, it may become necessary to especially make adjustment again in order to control various functions of the covering layer. On the other hand, if in a layer thickness smaller than 1 $\mu$m, there is a possibility that the covering layer can not withstand its friction with the photosensitive member.

The charging member may preferably have a volume resistivity within the range of from $10^4$ to $10^{14}$ Ω·cm. If it is less than $10^4$ Ω·cm, and when pinholes have occurred in the photosensitive member for some reason and the part where the pinholes are present comes to the charging zone at which the photosensitive member and the charging member form a nip, a leakage of currents may occur across the charging member and the pinholes of the photosensitive member to cause a great drop of voltage at the power supply. Hence, during the leakage, the charging becomes poor at the nip between the charging member and the photosensitive member in its entire longitudinal direction, so that in actual images an uneven image appears at every rotational period of the photosensitive member, which appears in black stripes in reverse development or in white stripes in regular development, resulting in a lowering of image quality. If on the other hand it exceeds $10^{14}$ Ω·cm, the resistance of the charging member may be too high to charge the photosensitive member at the desired potential, resulting in poor charging. This problem can be settled by correspondingly increasing the voltage to be supplied, which, however, makes efficiency very poor and is not practical.

In the present invention, a primer or the like may be applied between the resistance control layer 1c and the covering layer 1d or 1e or between the elastic layer 1b and the covering layer 1d or 1e in order to strengthen the adhesion between the resistance control layer 1c and the covering layer 1d or 1e or between the elastic layer 1b and the covering layer 1d or 1e.

The covering layer may be either a single layer or a multiple layer formed of two or more layers.

In the present invention, the volume resistivity is measured according to JIS K6911.

Figure 4:
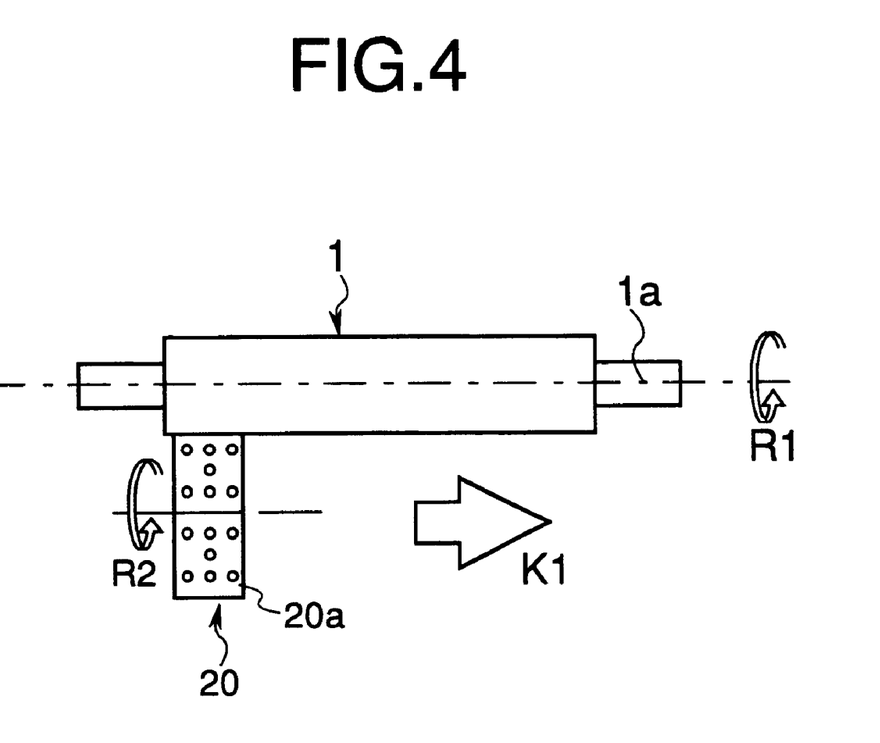
FIG. 4 schematically illustrates an example of the construction of an abrasion means used in the present invention.

The abrasion may usually be carried out under dry condition (dry abrasion), but may preferably be carried out under wet condition (wet abrasion) especially when the surface roughness must be made small. For example, as shown in FIG. 4, the charging roller 1 is rotated in the direction of an arrow R1, and the periphery 20a of a cylindrical grinding wheel 20 is brought into contact with the periphery of the roller under an appropriate pressure. While the grinding wheel 20 is rotated in the direction of an arrow R2, it is further moved in the direction of an arrow K1 to thereby abrade the charging roller 1 along its periphery. In the case of wet abrasion, water, an organic solvent or an oil is used in order to keep the abrading surface of the charging roller in wet condition. The organic solvent or oil has a possibility of contaminating the photosensitive member, a member to be charged, and hence water may preferably be used. When the organic solvent or oil is used, it is necessary to completely remove the organic solvent or oil from the charging roller surface after use.

FIG. 5 schematically illustrates the construction of an electrophotographic apparatus having a process cartridge having the charging member of the present invention as a primary charging means.

In FIG. 5, reference numeral 2 denotes an electrophotographic photosensitive member, which is rotated around an axis 3 in the direction of an arrow at a given peripheral speed. The photosensitive member 2 is uniformly charged on its periphery to a positive or negative, given potential through the charging member 1 of the present invention, serving as a primary charging means. The photosensitive member thus charged is then photoimagewise exposed to light 4 emitted from an imagewise exposure means (not shown) for slit exposure or laser beam scanning exposure. Thus, electrostatic latent images are successively formed on the periphery of the photosensitive member 2.

The electrostatic latent images thus formed are subsequently developed by toner by the operation of a developing means 5. The resulting toner-developed images are then successively transferred by the operation of a transfer means 6, to the surface of a transfer medium 7 fed from a paper feed section (not shown) to the part between the photosensitive member 2 and the transfer means 6 in the manner synchronized with the rotation of the photosensitive member 2.

The transfer medium 7 on which the images have been transferred is separated from the surface of the photosensitive member, is led through an image fixing means 8, where the images are fixed, and is then printed out of the apparatus as a copied material (copy).

The surface of the photosensitive member 2 after the transfer of images is brought to removal of the toner remaining after the transfer, through a cleaning means 9. Thus the photosensitive member is cleaned on its surface, further subjected to charge elimination by pre-exposure light 10 emitted from a pre-exposure means (not shown), and then repeatedly used for the formation of images. Since in the present invention the charging member 1 is a contact charging member, the pre-exposure is not necessarily required.

In the present invention, the apparatus may be constituted of a combination of plural components integrally joined as a process cartridge from among the constituents such as the above electrophotographic photosensitive member 2, charging member 1, developing means 5 and cleaning means 9 so that the process cartridge is detachable from the body of the electrophotographic apparatus such as a copying machine or a laser beam printer. For example, at least one of the electrophotographic photosensitive member 2, the developing means 5 and the cleaning means 9 may be integrally supported together with the charging member 1 to form a process cartridge 11 that is detachable from the body of the apparatus through a guide means such as a rail 12 provided in the body of the apparatus.

In the case when the electrophotographic apparatus is used as a copying machine or a printer, the light 4 of the imagewise exposure is light reflected from, or transmitted through, an original, or light irradiated by the scanning of a laser beam, the driving of an LED array or the driving of a liquid crystal shutter array according to signals obtained by reading an original and converting the information into signals.

The present invention will be described below in greater detail by giving Examples.

EXAMPLE 1

A charging roller as the charging member of the present invention was produced according to the following procedure.

A process cartridge (model name: EP-E Toner Cartridge), used in a laser beam printer (trade name: LBP-8 Mark IV; manufactured by Canon Inc.), was detached after images were reproduced on 8,000 sheets. Its charging roller was taken out of the process cartridge, and was used as a base for the charging roller of the present invention. The surface layer of the charging roller thus taken out was removed by wet abrasion using water.

On the charging roller having been thus abraded, a covering layer as shown below was formed.

|  | (by weight) |
| --- | --- |
| Methylol nylon | 100 parts |
| Conductive titanium oxide | 20 parts |

As materials for the covering layer, the above materials were dispersed and dissolved in a methanol/toluene mixed solvent to prepare a covering layer coating composition. This coating composition was coated on the charging roller by dipping to form a covering layer of 20 μm thick. Thus, the charging roller of the present invention was obtained.

Along the periphery of the charging roller thus obtained, aluminum foil of 10 mm wide was wound in close contact and a direct voltage (250 V) was applied across the support and the aluminum foil to measure the resistance of the charging roller at a temperature of 23.5° C. and a humidity of 50% by means of a resistance meter HIOKI 3119 DEGITAL MΩ HI TESTER (manufactured by Hioki Denki K.K.). Results obtained are shown in Table 1.

The surface roughness (Rz) of the charging roller obtained was also measured by the method previously described. Results obtained are shown in Table 1.

This charging roller was set in a virgin process cartridge (trade name: EP-E Toner Cartridge) and was used as a charging roller located at the primary charging assembly of the above laser beam printer to make a 6,000 sheet image reproduction running test. Images obtained at the initial stage and after the 6,000 sheet running were visually observed to evaluate image quality. Results obtained are shown in Table 2. In Table 2, "A" indicates that the images obtained are good; "B", practically usable; and "C", practically unusable.

The above image reproduction running test was made in an environment of temperature 15° C. and humidity 10% (environment 1) and in an environment of temperature 30° C. and humidity 80% (environment 2).

EXAMPLE 2

A charging roller as the charging member of the present invention was produced according to the following procedure.

|  | (by weight) |
| --- | --- |
| SBR | 100 parts |
| Carbon black | 30 parts |
| Zinc oxide | 5 parts |
| Fatty acid | 2 parts |

The above materials were kneaded for 10 minutes by means of a closed mixer controlled to 60° C. and thereafter 30 parts by weight of naphthene oil was added based on 100 parts by weight of the SBR, followed by further kneading for 20 minutes by means of a closed mixer cooled to 20° C. to prepare a material compound. To this material compound, as a vulcanizing agent 0.5 part by weight of sulfur and as vulcanizing accelerators 1 part by weight of a thiazole type vulcanizing accelerator and 1 part by weight of a thiurum type vulcanizing accelerator were added, all based on 100 parts by weight of the material rubber SBR, followed by kneading for 10 minutes by means of a twin-roll mill cooled to 20° C. The compound thus obtained was vulcanizing- molded around a stainless steel mandrel of 6 mm diameter by means of a press molding machine to form an elastic layer so as to have the shape of a roller of 12 mm in external diameter.

Next, on the elastic layer, a resistance control layer as shown below was formed.

|  | (by weight) |
| --- | --- |
| Polyurethane resin | 100 parts |
| Lithium perchlorate | 0.7 parts |
| Carbon black | 3 parts |

As materials for the resistance control layer, the above materials were dispersed and dissolved in a methyl ethyl ketone (MEK) solvent to prepare a resistance control layer coating composition. This coating composition was coated on the above elastic layer by dipping to form a resistance control layer in a layer thickness of 150 μm.

On the resistance control layer, a surface layer as shown below was further formed.

|  | (by weight) |
| --- | --- |
| Methylol nylon | 100 parts |
| Conductive tin oxide | 25 parts |

As materials for the surface layer, the above materials were dispersed and dissolved in a methanol/toluene mixed solvent to prepare a surface layer coating composition. This coating composition was coated on the resistance control layer by dipping to form a surface layer in a layer thickness of 20 μm, followed by drying to produce a charging roller. On the surface of the charging roller thus obtained, however, spitting having a diameter of about 1 mm was seen to have occurred. To remanufacture this charging roller having a defective coating, the surface layer having caused the spitting was removed by dry abrasion. On the charging roller from which the surface layer was removed by abrasion, a covering layer was formed again using the above surface layer coating composition. This time, no spitting occurred and the desired charging roller was obtained.

Evaluation of resistance and surface roughness of the charging roller and a 6,000 sheet image reproduction running test were made in the same manner as in Example 1. Results obtained are shown in Tables 1 and 2.

EXAMPLE 3

A charging roller was produced in the same manner as in Example 1 except that a water-based polyurethane emulsion (solid matter: 10%) was used as a covering layer coating composition to form a covering layer in a layer thickness of 12 μm. Evaluation was made similarly. Results obtained are shown in Tables 1 and 2.

EXAMPLE 4

|  | (by weight) |
|---|---|
| Polyurethane resin | 100 parts |
| Carbon black | 10 parts |

A charging roller was produced in the same manner as in Example 1 except that the above materials were dispersed and dissolved in a methyl ethyl ketone (MEK) solvent to prepare a covering layer coating composition and a covering layer was formed in a layer thickness of 200 μm. Evaluation was made similarly. Results obtained are shown in Tables 1 and 2.

EXAMPLE 5

A charging roller was produced in the same manner as in Example 4 except that the carbon black used in the covering layer was replaced with 1 part by weight of lithium perchlorate and a covering layer was formed in a layer thickness of 20 μm. Evaluation was made similarly. Results obtained are shown in Tables 1 and 2.

EXAMPLE 6

|  | (by weight) |
|---|---|
| Fluorine resin | 100 parts |
| Conductive tin oxide | 15 parts |
| Carbon black | 2 parts |

A charging roller was produced in the same manner as in Example 1 except that the above materials were dispersed and dissolved in a N-methylpyrrolidone (NMP) solvent to prepare a covering layer coating composition and a covering layer was formed in a layer thickness of 25 μm by spray coating. Evaluation was made similarly. Results obtained are shown in Tables 1 and 2.

EXAMPLE 7

A charging roller was produced in the same manner as in Example 6 except that, before the coating of the covering layer coating composition, a silane coupling agent γ-(2-aminoethyl)aminopropylmethyldimethoxysilane was coated as a primer on the surface (abraded surface) by dipping, followed by drying, and thereafter the covering layer was formed thereon. Evaluation was made similarly. Results obtained are shown in Tables 1 and 2.

EXAMPLE 8

A charging roller as the charging member of the present invention was produced according to the following procedure.

A process cartridge (model name: EP-E Toner Cartridge), used in a laser beam printer (trade name: LBP-8 Mark IV; manufactured by Canon Inc.), was detached after images were reproduced on 6,000 sheets. Its charging roller was taken out of the process cartridge, and was used as a base for the charging roller of the present invention. The surface layer of the charging roller thus taken out was removed by abrasion.

On the charging roller having been thus abraded, a covering layer was formed using a tubing as shown below.

|  | (by weight) |
|---|---|
| Nylon 12 | 100 parts |
| Carbon black | 20 parts |

As materials for the covering layer, the above materials were melt-kneaded and extruded into a tube, followed by stretching to obtain a tubing having an inner diameter of 14 mm and a wall thickness of 40 μm before heat shrinking. To the inside of this tubing, the charging roller previously obtained was inserted, followed by heating at 100° C. for 2 minutes to cause the tubing to heat-shrink on the charging roller to form a covering layer thereon. Thus, the charging roller of the present invention was obtained.

Evaluation on the charging roller thus obtained was made in the same manner as in Example 1. Results obtained are shown in Tables 1 and 2.

EXAMPLE 9

A process cartridge (model name: EP-E Toner Cartridge), used in a laser beam printer (trade name: LBP-8 Mark IV; manufactured by Canon Inc.), was detached after images were reproduced on 6,000 sheets. Its charging roller was taken out of the process cartridge, and was used as a base for the charging roller of the present invention. The surface layer of the charging roller thus taken out was removed by abrasion, and a covering layer was formed using a tubing as shown below.

|  | (by weight) |
|---|---|
| Silicone resin | 100 parts |
| Carbon black | 25 parts |

The above materials were melt-kneaded, and a tubing having an inner diameter of 10.5 mm and a wall thickness of 150 μm was obtained by extrusion. To the inside of this tubing, compressed air was blown and, while expanding the inner diameter of the tubing, the above charging roller having been abraded was inserted to the tubing. Thereafter, the compressed air was stopped blowing and the tubing was caused to shrink to form a covering layer. Thus, the charging roller of the present invention was obtained.

Evaluation on the charging roller thus obtained was made in the same manner as in Example 1. Results obtained are shown in Tables 1 and 2.

EXAMPLE 10

|  | (by weight) |
|---|---|
| Propylene resin | 100 parts |
| Conductive tin oxide | 15 parts |
| Carbon black | 10 parts |

A charging roller was produced in the same manner as in Example 9 except that the above materials were used to form a covering layer. Evaluation was made similarly. Results obtained are shown in Tables 1 and 2.

EXAMPLE 11

A charging roller was produced in the same manner as in Example 8 except that the nylon 12 used in the tubing was replaced with 100 parts by weight of polyurethane resin. Evaluation was made similarly. Results obtained are shown in Tables 1 and 2.

EXAMPLE 12

The charging roller remanufactured in Example 4 and on which each evaluation and image reproduction running test were made was secondly remanufactured in the following way.

The charging roller was abraded in the depth direction by 100 μm as an abrasion depth. Since immediately after the first remanufacturing the surface layer was in a layer thickness of 200 μm, it follows that, in the abrasion depth of 100 μm, the layer was removed by about a half.

On the periphery of the charging roller having been abraded, a tubing was covered in the following way.

|  | (by weight) |
| --- | --- |
| Propylene resin | 100 parts |
| Carbon black | 20 parts |

The above materials were melt-kneaded, and a tubing having an inner diameter of 10.5 mm and a wall thickness of 80 μm was obtained by extrusion. To the inside of this tubing, compressed air was blown and, while expanding the inner diameter of the tubing, the above charging roller having been abraded was inserted to the tubing. Thereafter, the compressed air was stopped blowing and the tubing was caused to shrink to form a covering layer. Thus, the charging roller of the present invention was obtained.

Evaluation on the charging roller thus obtained was made in the same manner as in Example 1. Results obtained are shown in Tables 1 and 2.

Comparative Example 1

A process cartridge (model name: EP-E Toner Cartridge), used in a laser beam printer (trade name: LBP-8 Mark IV; manufactured by Canon Inc.), was detached after images were reproduced on 6,000 sheets. Its charging roller was taken out of the process cartridge. To the surface of the charging roller taken out, powdery developer (toner) had adhered.

This charging roller was set in a virgin process cartridge (trade name: EP-E Toner Cartridge) as it was, without means such as cleaning, and was used as a charging roller located at the primary charging assembly of the above laser beam printer. Evaluation was made in the same manner as in Example 1. Here, with regard to resistance, that of the charging roller before the running test, on which the toner had adhered to its surface, was measured. Results obtained are shown in Tables 1 and 2.

In the environment 1, non-uniform charging caused by contamination of the charging roller slightly occurred in halftone image areas at the latter-half stage (4,500 sheets) of the image reproduction running test.

Comparative Example 2

A process cartridge (model name: EP-E Toner Cartridge), used in a laser beam printer (trade name: LBP-8 Mark IV; manufactured by Canon Inc.), was detached after images were reproduced on 6,000 sheets. Its charging roller was taken out of the process cartridge. To the surface of the charging roller taken out, powdery developer (toner) had adhered.

To completely remove the toner from the surface of this charging roller, the charging roller was immersed in MEK and cleaned with a brush. The charging roller having been thus cleaned was seen to have minute pinholes on its surface layer and its underlying resistance control layer was seen. Since this could not be put in practical use, neither measurement of surface roughness nor evaluation of images were made.

Comparative Example 3

A charging roller was produced in the same manner as in Example 1 except that no covering layer was formed after the abrasion. Evaluation was made similarly. Results obtained are shown in Tables 1 and 2.

TABLE 1

Results of Measurement of Roller Resistance and Surface Roughness

|  | Resistance (MΩ) | | | Surface roughness |
| --- | --- | --- | --- | --- |
|  | Edge | Middle | Edge | Rz (μm) |
| Example: | | | | |
| 1 | 0.85 | 0.89 | 0.95 | 3.688 |
| 2 | 0.96 | 1.08 | 1.02 | 5.023 |
| 3 | 2.00 | 1.91 | 1.85 | 3.221 |
| 4 | 1.06 | 0.91 | 1.23 | 3.048 |
| 5 | 1.11 | 0.97 | 1.20 | 2.366 |
| 6 | 1.22 | 1.05 | 1.18 | 4.293 |
| 7 | 0.95 | 1.08 | 1.27 | 4.510 |
| 8 | 1.23 | 1.15 | 1.08 | 4.025 |
| 9 | 1.59 | 1.90 | 1.82 | 4.683 |
| 10 | 2.34 | 2.56 | 2.52 | 4.443 |
| 11 | 1.03 | 1.23 | 1.25 | 4.203 |
| 12 | 1.31 | 1.00 | 0.94 | 3.914 |
| Comparative Example: | | | | |
| 1 | 2.63 | 3.69 | 3.30 | 3.721 |
| 2 | 1.24 | 1.06 | 1.11 | — |
| 3 | 0.76 | 0.81 | 0.80 | 9.533 |

TABLE 2

Results of Image Reproduction Running Test

|  | Environment 1 | | Environment 2 | |
| --- | --- | --- | --- | --- |
|  | Initial | 6,000 sh. | Initial | 6,000 sh. |
| Example: | | | | |
| 1 | A | A | A | A |
| 2 | A | A | A | A |
| 3 | A | A | A | A |
| 4 | A | A | A | A |
| 5 | A | A | A | A |
| 6 | A | A | A | A |
| 7 | A | A | A | A |
| 8 | A | A | A | A |
| 9 | A | A | A | A |
| 10 | A | A | A | A |
| 11 | A | A | A | A |
| 12 | A | A | A | A |

TABLE 2-continued

Results of Image Reproduction Running Test

| | Environment 1 | | Environment 2 | |
|---|---|---|---|---|
| | Initial | 6,000 sh. | Initial | 6,000 sh. |
| Comparative Example: | | | | |
| 1 | A | C | A | A |
| 2 | — | — | — | — |
| 3 | B | C | C | C |

What is claimed is:

1. A process for remanufacturing a charging member for electrophotography having at least two layers on a conductive support, the process comprising the steps of:

carrying out mechanical abrasion to remove at least a surface layer provided on the charging member, wherein the mechanical abrasion is wet abrasion using water; and forming a layer on the surface laid bare by the abrasion.

2. The process according to claim 1, wherein said charging member has an elastic layer and a covering layer.

3. The process according to claim 1, wherein said charging member has the shape of a roller.

* * * * *

UNITED STATES PATENT AND TRADEMARK OFFICE
CERTIFICATE OF CORRECTION

PATENT NO.     : 6,337,103 B1
DATED          : January 8, 2002
INVENTOR(S)    : Inoue et al.

It is certified that error appears in the above-identified patent and that said Letters Patent is hereby corrected as shown below:

<u>Title page,</u>
Item [57], ABSTRACT,
Line 7, "hanging" should read -- charging --.

<u>Column 2,</u>
Line 39, "of;" should read -- of: --.

<u>Column 4,</u>
Line 66, "can not" should read -- cannot --.

<u>Column 7,</u>
Line 19, "DEGI-" should read -- DIGI- --.

Signed and Sealed this

Eighteenth Day of March, 2003

JAMES E. ROGAN
*Director of the United States Patent and Trademark Office*